United States Patent [19]

McGillivray et al.

[11] Patent Number: 5,213,836

[45] Date of Patent: May 25, 1993

[54] METHOD OF PREPARATION OF SUGAR BEET FIBER MATERIAL

[75] Inventors: Terry D. McGillivray; David R. Groom, both of Moorehead, Minn.; Dennis Brown, Fargo, N. Dak.; Richard R. Fergle; Gregory Haakenson, both of Moorhead, Minn.

[73] Assignee: American Crystal Sugar Company, Morehead, Minn.

[21] Appl. No.: 762,557

[22] Filed: Sep. 18, 1991

[51] Int. Cl.⁵ .............................................. A23L 1/214
[52] U.S. Cl. .................................... 426/615; 426/804
[58] Field of Search ................................ 426/615, 804

[56] References Cited

U.S. PATENT DOCUMENTS

| | | |
|---|---|---|
| 3,816,389 | 6/1974 | Mihara et al. . |
| 4,241,093 | 12/1980 | Farag et al. . |
| 4,273,590 | 6/1981 | Cronewitz et al. . |
| 4,379,782 | 4/1983 | Staub et al. . |
| 4,451,489 | 5/1984 | Beale et al. . |
| 4,460,504 | 7/1984 | Rubin et al. . |
| 4,629,575 | 12/1986 | Weibel . |
| 4,717,451 | 1/1988 | Devic et al. . |
| 4,783,239 | 11/1988 | Rich . |
| 4,795,653 | 1/1989 | Bommarito . |
| 4,812,206 | 3/1989 | Devic et al. . |
| 4,831,127 | 5/1989 | Weibel . |
| 4,923,981 | 5/1990 | Weibel et al. . |
| 4,966,984 | 10/1990 | Devic . |
| 5,008,254 | 4/1991 | Weibel . |
| 5,137,744 | 8/1992 | Cagley .............................. 426/615 |

OTHER PUBLICATIONS

French PCT International Demand, PCT International Application No. PCT/FR89/00439.
French Request for Letters Patent, Publication No. 2 589 683.

Primary Examiner—Carolyn Paden
Attorney, Agent, or Firm—Welsh & Katz, Ltd.

[57] ABSTRACT

A method of preparation of sugar beet fiber material for use as a non-caloric, non-coloring, bland ingredient in foodstuffs, comprising cleaning, peeling, and slicing sugar beets into cossettes and blanching the cossettes. The blanched cossettes have the sugar removed by extraction and are tissue milled to reduce the particle size. The resulting slurry may be further solvent extracted, washed, and dried.

9 Claims, No Drawings

METHOD OF PREPARATION OF SUGAR BEET FIBER MATERIAL

This application relates to a method for preparing an edible fiber material, and more particularly to a method for the preparation of edible fiber material from sugar beets which can be incorporated into a food product.

BACKGROUND OF THE INVENTION

One manner of preparing foodstuffs having reduced caloric content involves the replacement of some of the caloric-containing constituents of the food product with non-digestible substances. Such non-digestible substances include various forms of purified plant cellulose, otherwise known as fiber. Due to the large amount of sugar beet pulp produced annually as a byproduct in the sugar industry, much incentive exists for the conversion of sugar beet pulp to an edible fiber for use as such a non-caloric substitute constituent in food products.

Dietary fibers are currently enjoying a period of renewed interest in the food industry. The ability of fiber to absorb water increases salt hydration which facilitates intestinal transit. Diets rich in fiber are found to provide a wide variety of health benefits.

When adding fiber to processed foodstuffs, a primary concern is to add little or no coloring, little or no tastes and little or no caloric value. If these goals are met, the food to which the fiber is added retains as much of its original nature as possible, yet contains additional fiber.

Analysis of such supplemental fiber material involves measurement of total dietary fiber (TDF), soluble dietary fiber (SDF) and insoluble dietary fiber (IDF). In general, a higher value of TDF and SDF is desirable. Another means of evaluation of supplemental fiber material measures color by measurement of L (reflectivity), (green-red characteristics), and B (yellow blue characteristics) values. In general, a comparison of such LAB values is made against a standard material, such as $\alpha$-cellulose.

Processes are known for preparing sugar beet pulp material into a good source of fiber which may be incorporated into foodstuffs. Typically, sugar beets that are received from growers have been defoliated or scalped. The beets are partially cleansed of extraneous materials and stored in large piles for up to five months as they await processing. The beets are washed, and then sliced into long thin strips, like shoestring potatoes, using a rotary slicer. The cossettes thus obtained are generally about 3 mm to 4 mm thick and 4 cm to 5 cm long. The sugar beet cossettes are then water-extracted and the spent sugar beet cossettes or pulp is dewatered. In general, the production of fiber from sugar beets involves a process wherein the sugar beet pulp material is coarsely ground or sliced to form a coarse pulp slurry. Of course, the coarse pulp slurry can be collected from a processing plant after the sugar is removed from sugar beet cossettes. The pulp slurry is then placed in a stabilizer solution to prevent darkening of the cossettes and water washed to remove substantially all the soluble carbohydrates. The water washed sugar beet pulp slurry is then contacted with an alcoholic solution to remove color and flavor. Thereafter, the water and alcohol are removed and the material is optionally ground to a flour consistency. The sugar beet pulp generally has a number of objectional flavor components which may be removed with the alcohol extraction.

SUMMARY OF THE INVENTION

The principle object of the object invention is a source of improved fiber for use in foodstuffs.

A further object of the subject invention is a source of non-nutritive or dietary fiber for use in foodstuffs.

A still further object of the subject invention is an improvement in the viscosity, stabilization, and texture in foodstuffs.

Yet another object of the subject invention is a foodstuff having overall lower caloric value, while retaining good physical and chemical properties, good taste, color, and suitable processability.

These and other objects are attained in the the subject invention wherein there is provided a method for the production of sugar beet fiber material suitable for use in foodstuffs. This process involves washing and steam-peeling the beets, slicing them into cossettes, inspecting and rejecting those cossettes with defects, blanching the cossettes, extracting the sucrose, washing the extracted pulp, and then grinding the pulp by either a high-speed rotor which produces a very high shear force, such as found in a colloid mill (i.e., tissue milling), or pumping a slurry of the particular matter through an orifice at high pressure (i.e., homogenizing). The resultant milled fiber slurry is then acid-washed and dried. Optimally, after acid-washing, the slurry could be press-dried and then put through a solvent extraction step utilizing an alcohol/water wash, after which the slurry is put through a steam distillation and washed with water, and dried.

DETAILED DESCRIPTION OF THE SUBJECT INVENTION

The fiber material of the subject invention is prepared from sugar beet cossettes. Sugar beets can be processed by cleaning, slicing, blanching, and extracting sugar prior to processing according to the subject invention. Alternatively, sugar beet pulp material may be obtained from a processor, providing the pulp can be blanched by the processor.

The sugar beet cossettes, or freshly ground or sliced sugar beet pulp material, should immediately be placed in a stabilizer solution to prevent enzymatic and non-enzymatic darkening of the pulp. Suitable stabilizer solutions include water-soluble bisulfides, sulfite, meta-bi-sulfites, sulfur dioxide, and the like. The sugar beets, at this point, are drained of excess water.

Where the starting material is sugar beets as received from growers, they are first washed to remove extraneous matter and impurities, steam-peeled, and sliced into cossettes approximately $\frac{1}{8}''$–3/16" thick and 2"–5" long in a V-shaped cross-section. The drained sugar beet cossettes or pulp material are blanched with hot water or steam to raise the temperature of the material to 100° C. for up to 2 minutes.

Sucrose is then extracted from the blanched cossettes, after which a beet pulp slurry remains. This beet pulp slurry is then further processed to reduce or eliminate the objectionable flavor components of sugar beet pulp by mechanical disruption of the pulp cells, called tissue grinding. The tissue grinding may be accomplished in either of two manners—in the first, a stator is set very close to a high-speed rotor to produce a very high-shear force; typical grinding apparatus which performs this function is called a "colloid mill." A second manner of tissue grinding pumps a slurry of the particulant matter through an orifice at high pressure, an apparatus commonly called a "homogenizer." When tissue grinding, the particle size of the particulate matter produced was a compromise between that which gave the greatest amount of cellular disruption consistent with being a product that could be washed and pressed in conventional equipment. Microscopically, the slurries were in the range of 6 to 25 cells in aggregate clumps. If the slurries were recirculated for a regrinding, no identifiable cells were found and such slurries could not be effectively washed or pressed and were of poor flavor.

After tissue milling, the dewatered pulp material was washed, with a water extraction. The wash water is acidified to a pH of between 4 and 7, and preferably 5. Acidification may accomplished with an weak organic acid. However, acetic acid is preferred. Solvent extraction and solvent recovery proceeds as before and the resulting product is dried as before.

Solvent extraction of the cossettes may be utilized after tissue milling. The extraction may utilize suitable alcoholic solutions, and may be used to remove various bitter constituents and color from the sugar beet pulp not removable by tissue milling. Appropriate solvents include methanol, ethanol, or isopropanol, alone or in combination with water. Other solutions may be used as known in the art. Preferably, an isopropanol water solvent is used. Various solvent extraction procedures may be used, including continuous extraction methods, continuous batch extraction methods, counter-current extraction methods, and the like. During extraction, the water in the pulp is replaced with alcohol, and then the alcohol is removed. To remove the alcohol, the pulp is pressed. The result is a drier product of approximately 50% dry solids. The solvent removed from the pressing can be returned to a solvent extractor, bypassing the distillation process for recovery and reuse.

The dried pulp, with only 50% aqueous alcohol by weight, would then be transferred to a thermal desolventizer to recover as much of the alcohol as possible. In the thermal desolventizer, food grade steam is directly injected into the pulp to reverse the extraction process and replace the alcohol with water. This process leaves the pulp at approximately 30% moisture. The pulp is then further dried with an apron drier to yield a sugar beet fiber product which is high in fiber, generally colorless, bland, and substantially non-caloric.

The sugar beet fiber product prepared as above is analyzed for fiber content, color, and other values. The results are set forth in Table I and compared with other fiber sources.

The following test of consumer products are conducted utilizing beet fiber material prepared according to one or more of the above methods of the subject invention.

EXAMPLE 1

Muffins

This test is conducted using a bland recipe for the muffins to be able to distinguish between fiber types. All of these samples are evaluated against muffins that contained either commercial oat fiber or Alpha Cellulose as reference marks. The muffins are formulated at 3 gm (5%) and 4 gm (6.7% of fiber per muffin.

TABLE 2

| | Sample | Production Process |
|---|---|---|
| 1. | Solvent Extracted | Pulp is produced from hand peeled beets. Isopropyl alcohol extraction. |
| 2. | Tissue Milled | Pulp is produced from hand peeled beets, same beet source as #1. Then tissue milled. |
| 3. | Tissue Milled, then Solvent Extracted | Same as #1 and #2 |
| 4. | Tissue Milled Factory Pulp | Pulp from sugar production line is deashed and then tissue milled. |

The muffins are evaluated based on overall impressions, flavor strength, moistness, graininess/grittiness, bitterness, off flavor and chalkiness.

The results are as follows:

The solvent extracted (3 and 4 gms) and tissue milled (3 gm) do very well against oat fiber and Alpha Cellulose.

TABLE I

| | FIBER ANALYTICAL VALUES | | | | | | | | |
|---|---|---|---|---|---|---|---|---|---|
| PROCESS | TDF (%) | SDF (%) | IDF (%) | ASH (%) | WHC (%)* | PROTEIN (%) | L | A | B |
| EXTRUSION | 84 | 7 | 77 | 3.2 | 944 | 9.3 | 76.3 | −1.2 | 19 |
| TISSUE MILLING | 88 | 21 | 67 | 2.6 | 722 | 6.4 | 82.3 | −2.5 | 17 |
| SOLVENT EXTRACTED | 86 | 20 | 66 | 3.0 | 899 | 8.1 | 85.0 | −3.4 | 12 |
| TISSUE MILLED & SOLVENT EXTRACTED | 88 | 21 | 67 | 2.7 | 802 | 6.5 | 87.4 | — | — |
| BLEACHED* | 82 | 11 | 71 | 3.5 | 600 | 8.9 | 80.9 | −1.37 | 17 |
| α-CELLULOSE | 99 | 0 | 99 | 0.1−0.2% | 290 | 0.2−0.4 | 89.7 | — | — |

*Solution of 40% NaOH and 35% $H_2O_2$ added to dried sugar beet pulp (55% moisture)
*WHC = Water Holding Capacity Solvent extracted and tissue milled (3 gm) show no significant differences from each other across all attributes.

The extruded and factory tissue milled fibers show significant differences from oat fiber across all attributes.

The solvent extracted/tissue milled combination shows slightly better characteristics in all regards than either process individually.

EXAMPLE 2

Cereal

This test is conducted on high fiber cereal using a crisp rice base formula for its bland flavor. This formula was also chosen to be able to distinguish between fiber types. All of these fibers are evaluated against a commercial oat fiber. All fiber types are run at levels of both 10% fiber and 20% fiber.

TABLE 3

| Sample | | Production Process |
|---|---|---|
| 1. | Solvent Extracted | Pulp is produced from hand peeled beets and isopropyl alcohol extracted. |
| 2. | Tissue Milled | Pulp is produced from hand peeled beets, same beet source as #1, and then tissue milled. |
| 3. | Tissue Milled, Run 1 | Steam peeled, crowned beets, major blemishes removed. Produced on large pilot plant scale. |
| 4. | Tissue Milled, Run 2 | Steam peeled, not crowned and blemishes not removed. |
| 5. | Solvent Extracted, Tissue Milled | Same as #1 and #2. |

The cereal is evaluated on the basis of overall impressions, flavor strength, sweetness, crispiness, bitterness, and chalkiness.

The results are as follows:

Solvent extracted performs very well against the oat fiber at 10% and 20% levels. It is at parity on all measures except crispiness and chalkiness (where it is less chalky at 20%).

Run 1 is not significantly different at the 10% level in all attributes except crispiness and chalkiness.

All other fiber types not involving solvent extraction are significantly different at both 10% and 20% levels in all attributes from the oat fiber and solvent extracted. In other words, tests 2, 3, and 4 of Table 2 were not acceptable.

EXAMPLE 3

Diet Drink

A vanilla-flavored high fiber diet drink was formulated to compare Ultra-Slim ™ fast diet drink in flavor. Oat fiber and Alpha Cellulose formulations were also run in this test as reference marks. The drink was formulated at 4 gms (1.5%) of fiber per serving. The processes that were run in this test are:

TABLE 4

| Sample | | Production Process |
|---|---|---|
| 1. | Solvent Extracted | Pulp produced from hand peeled beets. Isopropyl alcohol extraction. |
| 2. | Tissue Milled | Pulp produced from hand peeled beets, same source as #1. Then tissue milled. |
| 3. | Tissue Milled, Run 1 | Steam peeled, crowned beets, major blemishes removed, produced on a large pilot plant scale. |
| 4. | Solvent Extracted, Tissue Milled | Same as #1 and #2. |

The drink is evaluated based on overall impressions, flavor strength, sweetness, bitterness, smoothness, and chalkiness.

The results are as follows:

All fiber types were rated significantly different than the commercial oat fiber and Alpha Cellulose for all attributes.

Solvent extracted and tissue milled are rated lower in flavor strength than the oat fiber; therefore, the overall preference does not appear to be due to flavor strength.

Bitterness and texture appear to be the largest components impacting the overall preference.

All three beet fibers are rated significantly lower in smoothness and higher in chalkiness relative to the two control fibers.

Reviewing the results from all three of the consumer tests, the solvent extracted beet fiber rates very close to the commercial oat fiber in all three products. Tissue milled beet fiber at the lower levels does fairly well compared to the oat fiber. However, tissue milled beet fiber at higher levels does not appear to perform as well as solvent extracted beet fiber.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments and equivalents falling within the scope of the appended claims.

Various features of the invention are set forth in the following claims.

We claim:

1. A process for preparing a fiber material from sugar beets for use in foodstuffs as a non-caloric, decolorized, and bland ingredient, comprising the steps of:
   (a) washing the beets;
   (b) peeling the washed beets;
   (c) preparing cossettes by slicing the peeled beets;
   (d) inspecting said cossettes and rejecting cossettes with defects;
   (e) blanching said cossettes by raising the temperature of said cossettes to 100° C.;
   (f) extracting the sucrose form said blanched cossettes;
   (g) reducing the particle size of said cossettes from which the sucrose has been extracted to form a slurry having aggregate clumps of from about 6 cells to about 25 cells;
   (h) washing said slurry with an acid wash having a pH of between about 4.5 to about 7.0; and
   (i) drying said slurry.

2. The process of claim 1 wherein the step of reducing the particle size of said cossettes comprises passing said cossettes through a colloid mill.

3. The process of claim 1 wherein the step of reducing the particle size of said cossettes comprises pumping a slurry of said cossettes through an orifice at high pressure.

4. The process of claim 1 wherein said slurry is washed with a weak organic acid.

5. The process of claim 1 wherein said slurry is washed with an acetic acid solution.

6. The process of claim 1 further including the steps of:
   (a) washing said slurry with an alcohol/water solution;
   (b) pressing said washed slurry to remove solution;
   (c) washing with water; and
   (d) drying said slurry.

7. The process of claim 6 wherein said slurry is acid extracted prior to washing with an alcohol/water solution.

8. The process of claim 1 wherein the step of peeling said beet is by steam-peeling.

9. The process of claim 1 wherein the pH of the water wash is about 5.0.

* * * * *